UNITED STATES PATENT OFFICE.

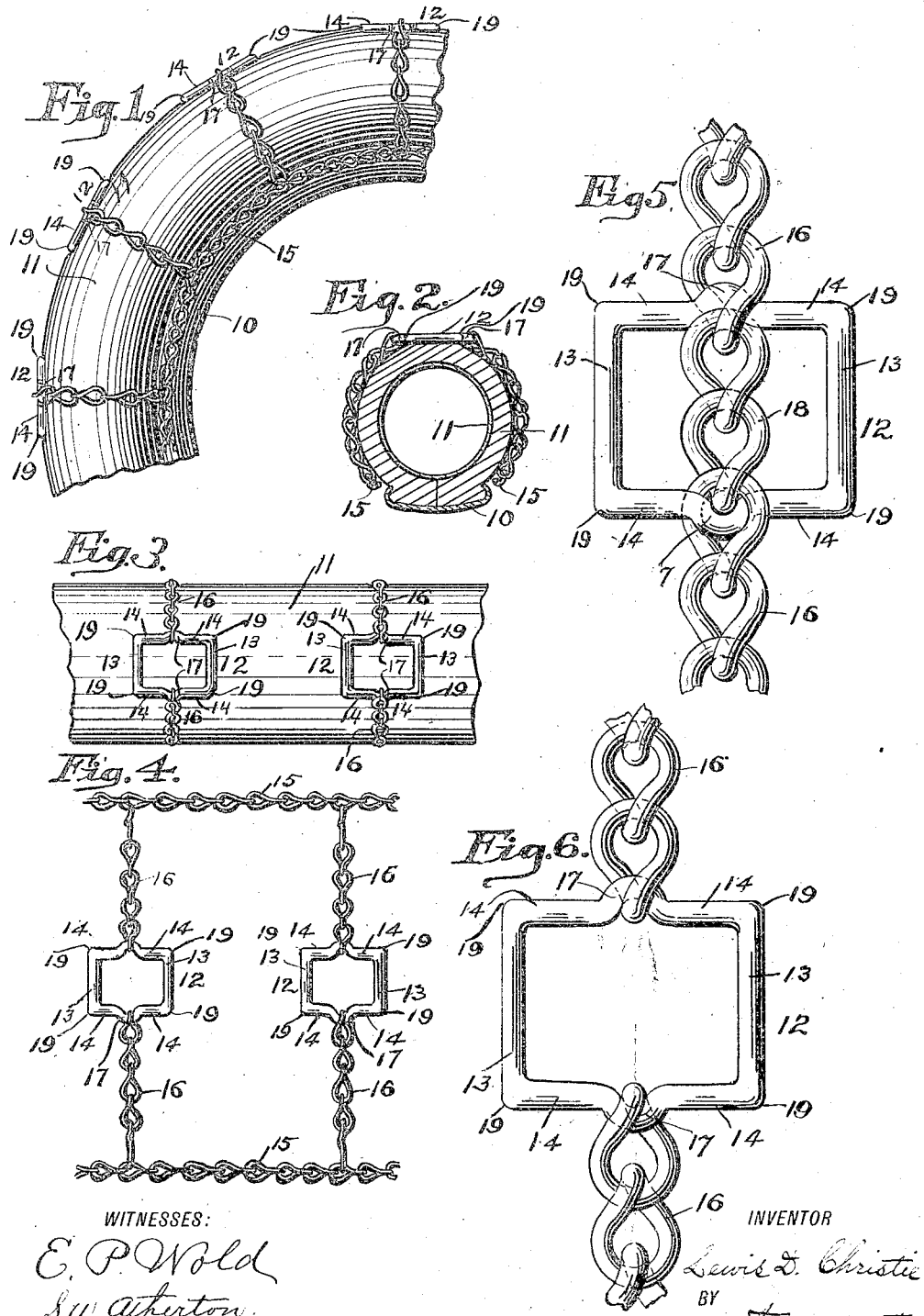

LEWIS D. CHRISTIE, OF BRIDGEPORT, CONNECTICUT.

NON-SKIDDING DEVICE.

966,082.   Specification of Letters Patent.   Patented Aug. 2, 1910.

Application filed February 4, 1910. Serial No. 542,043.

*To all whom it may concern:*

Be it known that I, LEWIS D. CHRISTIE, a citizen of the United States, residing at Bridgeport, county of Fairfield, State of Connecticut, have invented an Improvement in Non-Skidding Devices, of which the following is a specification.

This invention relates to certain new and useful improvements in non-skidding devices.

The invention has for its object the production of an improved device which can be readily applied to or removed from the wheel of a motor vehicle, and adapted to effectively check sliding movement or skidding in all directions. With this object in view the invention will be hereinafter fully set forth and particularly pointed out in the claim.

Figure 1 is an elevation of a portion of the rim and tire of an automobile wheel, showing a non-skidding device provided with my novel stop pieces applied thereto; Fig. 2 a cross section of the rim and tire showing one of my novel stop pieces in elevation; Fig. 3 a plan view of a portion of a tire with my novel non-skidding device applied thereto; Fig. 4 a plan view of a portion of a non-skidding device showing a convenient and practical mode of attaching my novel stop plates; and Figs. 5 and 6 are enlarged detail plan views showing variant modes of attaching the stop plates to cross chains.

It is of course well understood that the non-skidding devices in general use consist essentially of side chains and cross chains attached thereto in various ways and lying in contact with the tread of the tire. In practice these devices do not effectually accomplish the desired result for the reasons that they become clogged with mud and ice and so lose their holding power, and furthermore that the curves of the links of the chains permit the wheels to slide as they do not present angular obstructions to forward and lateral movement. On the other hand they permit forward movement of high power machines and owing to the curvature of the chain links cause sidewise movement or skidding of the machine. My present invention goes a long way toward overcoming these objections for the reason that it provides obstructions to forward movement lying transversely to the direction of movement and obstructions to sidewise movement lying parallel with the direction of forward movement.

10 denotes a rim and 11 the tire of an automobile wheel. 12 denotes my novel stop pieces, which comprise portions 13 which lie transversely to the direction of forward movement of the wheel and portions 14 which lie parallel with the direction of forward movement of the wheel, said portions intersecting at angles indicated by 19, which may be right angles as shown or the angles may be more or less acute if preferred. These stop pieces may be cast or forged or formed from pieces of rod with the ends welded together, as preferred. The special mode in which my novel stop pieces are held in place is wholly immaterial so far as the present invention is concerned. I have shown an anti-skidding device consisting of side chains 15 and cross chains 16 to which my novel stop pieces are attached. These cross chains extend over the face of the tire at right angles to the side chains. This, however, is wholly immaterial as they may extend diagonally if preferred. I find in practice that the arrangement shown is entirely satisfactory and holds a heavy rapidly-moving machine against side movement much more effectually than any devices of the character heretofore produced. In order to prevent the cross chains from slipping on portions 13 of the stop pieces, I provide said portions with loops or eyes 17 which receive the end links of the cross chains and prevent them from sliding, as clearly shown in Fig. 6.

If preferred, instead of using two independent cross chains, as in Fig. 6, each extending from one side of the stop piece to the corresponding side chain, a single cross chain may be used, as in Fig. 5, links of the chain, specifically indicated by 18, lying between the portions 13 of the stop piece, said portions being simply passed through links of the chain.

The operation will be obvious from the drawing. An important feature of the invention is the portions 13 and 14 of the stop pieces intersecting at an angle. The sides of these angles, which need not be right angles but may be more or less acute if preferred, engage the mud, slush or ice and act as obstructions to check sliding movement of the wheel either directly ahead or laterally. In other words, these stop pieces act as stops against sliding movement in either direction and do not pack with mud or ice and slide both forward and laterally as ordinary chains do owing to the curves of the links of the chain. In this connection it will be noted that by forming the sides of the stop pieces with the offset loop portions, sliding movement of the cross chains is prevented.

Having thus described my invention I claim:

A non-skidding device for automobile wheels comprising side chains, angular stop pieces of skeleton form adapted to engage the tread of a tire, and cross chains connecting the stop pieces with said side chains, portions of the sides of said stop pieces being bent out of alinement to form central offset loop portions adapted to engage said cross chains and prevent relative sliding movement of the latter.

In testimony whereof I affix my signature in presence of two witnesses.

LEWIS D. CHRISTIE.

Witnesses:
JEROME ORCUTT,
OWEN BURNS.